United States Patent
Kupsh et al.

(10) Patent No.: US 8,200,259 B2
(45) Date of Patent: Jun. 12, 2012

(54) NETWORK-SPECIFIC TRANSCODING OF MMS CONTENT

(75) Inventors: Jerry Kupsh, Concord, CA (US); Brandie P. Roberts, Berkeley, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 511 days.

(21) Appl. No.: 12/235,722

(22) Filed: Sep. 23, 2008

(65) Prior Publication Data

US 2010/0075699 A1    Mar. 25, 2010

(51) Int. Cl.
*H04W 4/00* (2009.01)
(52) U.S. Cl. .......... 455/466; 455/412.1; 455/412.2; 455/414.4; 709/206; 709/246
(58) Field of Classification Search .......... 455/412.1, 455/412.2, 413, 414.1–414.4, 432.2, 432.3, 455/466, 566, 567; 709/206, 203, 246; 715/239, 715/249, 744, 746; 348/441; 370/328.338, 370/352, 355
See application file for complete search history.

(56) References Cited

U.S. PATENT DOCUMENTS

| | | | | |
|---|---|---|---|---|
| 7,383,347 B2 * | 6/2008 | Ebling et al. | ................... | 709/232 |
| 7,526,572 B2 * | 4/2009 | Omar et al. | ................... | 709/246 |
| 7,817,987 B2 * | 10/2010 | Mian et al. | ................. | 455/412.2 |
| 8,050,660 B2 * | 11/2011 | Mian et al. | ................. | 455/412.1 |
| 2004/0111476 A1 * | 6/2004 | Trossen et al. | ................ | 709/206 |
| 2004/0258063 A1 * | 12/2004 | Raith et al. | .................... | 370/389 |
| 2005/0075093 A1 * | 4/2005 | Lei et al. | .................... | 455/412.1 |
| 2006/0080740 A1 * | 4/2006 | Bremer et al. | ................... | 726/26 |
| 2006/0101160 A1 * | 5/2006 | Coulombe | .................... | 709/246 |
| 2008/0040374 A1 * | 2/2008 | Prabhakar et al. | ............ | 707/101 |
| 2008/0207182 A1 * | 8/2008 | Maharajh et al. | .......... | 455/414.1 |

* cited by examiner

*Primary Examiner* — Anthony Addy

(57) ABSTRACT

A method may include receiving a multimedia messaging service (MMS) message from a sending device, the MMS message being addressed to a terminating device. A notification may be sent to the terminating device that the MMS message is available. A user agent profile may be received from the terminating device, the user agent profile including a network indicator to indicate the type of network currently servicing the terminating device. It may then be determined if transcoding of the MMS message is required based on the type of network indicated in the user agent profile and attributes of the MMS message.

18 Claims, 6 Drawing Sheets

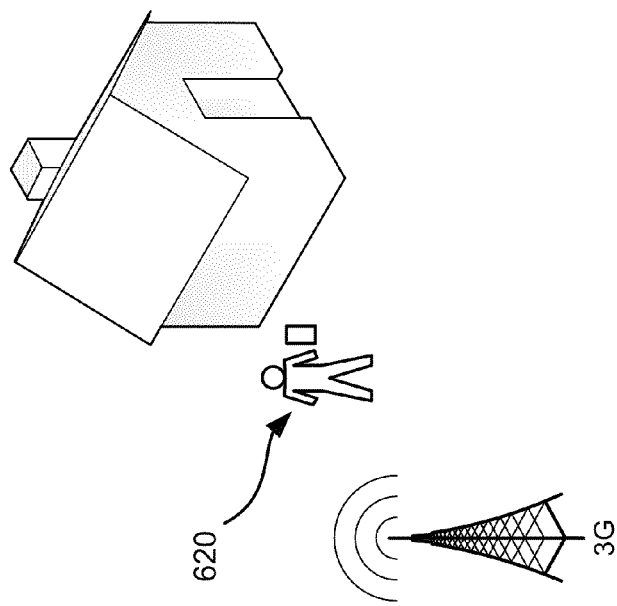
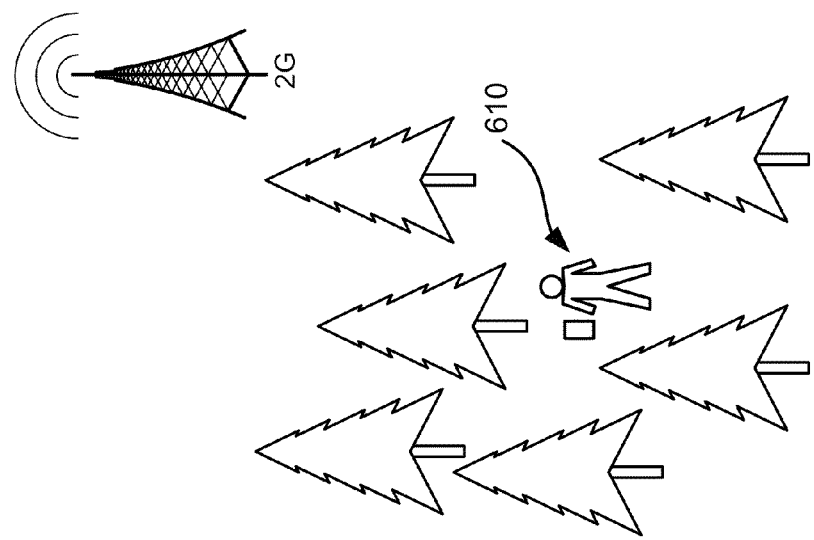
FIG. 6

NETWORK-SPECIFIC TRANSCODING OF MMS CONTENT

BACKGROUND INFORMATION

Multimedia messaging service (MMS) is a standard for telephone messaging systems that allows sending messages that include multimedia objects (such as images, audio, video, rich text, etc.). An MMS-enabled mobile device may be used by a subscriber to compose and send and receive messages that include multimedia objects.

Second generation (2G), third generation (3G), and fourth generation (4G) mobile phone standards represent a family of standards under the International Mobile Telecommunications program. Generally, 3G and forthcoming 4G networks are wide area cellular telephone networks which can support MMS applications. In contrast, 2G networks have lower data transmission capabilities (compared to 3G and 4G) that may not support the full capabilities of an MMS-enabled mobile device. Currently, 3G network coverage is not universally available, such that a roaming MMS-enabled mobile device may sometimes rely on a 2G network for service.

BRIEF DESCRIPTION OF THE DRAWINGS

FIG. 6 is provides an exemplary scenario of using an MMS service with network-specific transcoding in accordance with an implementation.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and methods to allow a terminating device (e.g., a mobile telephone) to receive multimedia messaging service (MMS) messages in a format appropriate to the network access technology available to the terminating device. In one implementation, the terminating device may include at least two user agent (UA) profiles to indicate available network coverage, such as, for example, a 2G UA profile and a 3G/4G UA profile. Using the appropriate UA profile, the terminating device may alert an MMS portal of the network coverage available to the terminating device at the time the terminating device is notified that an MMS message is intended for delivery. The MMS portal may then transcode the MMS message in a format suitable for delivery over the type of network that is being used by the terminating device at the time the MMS message is being delivered.

As used herein "transcoding" may generally refer to a process of adapting content in an MMS message to ensure that the MMS message can be delivered over available network resources. For example, in one implementation, transcoding may refer to convert a high resolution image to a lower resolution image. Transcoding may also be used to convert audio, video, application files, and the like. As used herein, the term "user" may include a registered user of an MMS service, where a "sending user" or "sender" may include a user sending an MMS message, and a "terminating user" or "recipient" may include a user who is intended to receive the MMS message. A "sending device" may include a mobile device used by a sender, while a "terminating device" may be a mobile device used by a recipient.

Figure 1:
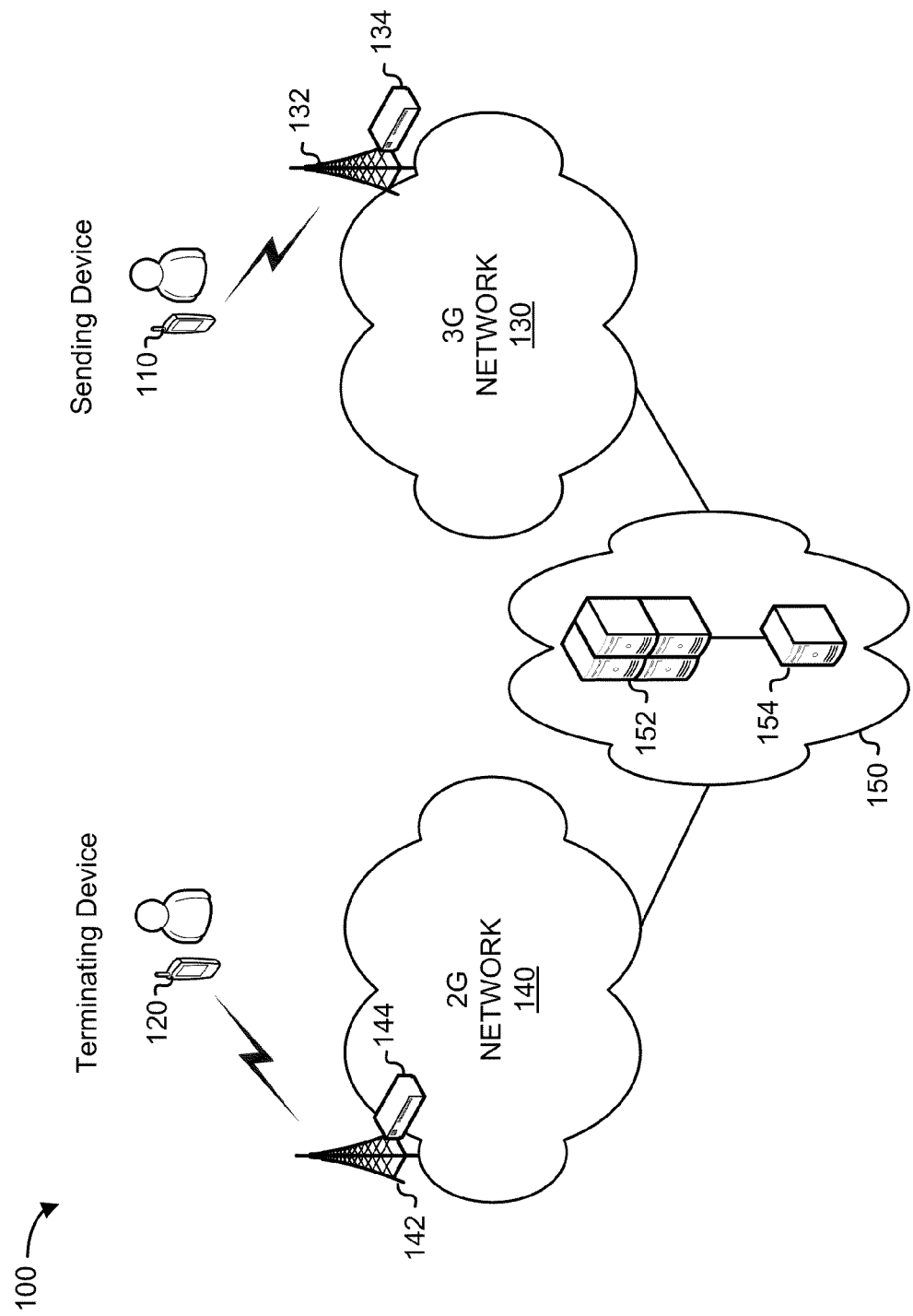
FIG. 1 depicts an exemplary system in which systems and methods described herein may be implemented.

FIG. 1 depicts an exemplary system 100 in which concepts described herein may be implemented. As illustrated, system 100 may include a sending device 110, a terminating device 120, a 3G network 130, a 2G network 140, and an MMS portal 150. MMS portal 150 may include a multimedia messaging service center (MMSC) 152 and a transcoder 154. Sending device 110 and terminating device 120 may generally connect to 3G network 130 and/or 2G network 140 via wireless connections. MMSC 152 and transcoder 154 of MMS portal 150 may connect to each other and to 3G network 130 and/or 2G network 140 via wired and/or wireless connections.

Sending device 110 and terminating device 120 may each include any type of device that is able to communicate via a network. For example, sending device 110 and terminating device 120 may include any type of device that is capable of transmitting and receiving multimedia data (e.g., images, audio, video, rich text, etc) to/from 3G network 130 and/or 2G network 140. In an exemplary implementation, one or both of sending device 110 and terminating device 120 may include a mobile terminal. As used herein, the term "mobile terminal" may include a cellular radiotelephone; a Personal Communications System (PCS) terminal that may combine a cellular radiotelephone with data processing and data communications capabilities; a personal digital assistant (PDA) that can include a radiotelephone, Internet/Intranet access, and/or MMS applications; a portable game and/or music playing device; and/or a conventional laptop and/or palmtop receiver or other appliance that includes a radiotelephone transceiver. In another exemplary implementation, one or more of sending device 110 and terminating device 120 may include a desktop computer or other fixed-location computing device. In still another implementation, sending device 110 may be a server providing MMS multimedia data to terminating device 120.

3G network 130 and 2G network 140 may include a combination of networks including a cellular network that uses components for transmitting data to and from sending device 110, terminating device 120, and/or MMS portal 150. Such components may include base station antennas 132 and 142 that transmit and receive data from communication devices within their vicinity. Such components may also include base stations 134 and 144 that connect to the base station antennas and communicate with other devices, such as switches and routers (not shown).

3G network 130 may include one or more wide area cellular networks supporting a CDMA Evolution-Data Optimized (EVDO) Rev. A standards, a GPRS network, or any other network operating on a wireless interface supporting high downlink data rates (data rates above, for example, 2.5 Mbps). In contrast, 2G network 140 may include one or more wide area cellular networks, including an CDMA EVDO Rev. 0, CDMA interim standard 95 (IS-95), CDMA 1xRTT, GSM, or any other network operating on a wireless interface supporting comparatively lower downlink data rates (maximum data rates below, for example, 2.5 Mbps) than 3G network 130. While the systems and methods herein are described in the context of 3G network 130 and 2G network 140, it should be understood that 3G network and 2G network may represent other disparate networks, where the capabilities of the network servicing the terminating device (e.g., represented as 2G network 140) are inadequate to provide MMS messages in the format originally provided by the sending device. In addition, 3G network 130 and/or 2G network 140 may include mechanisms other than a cellular network for example, such as the Internet, a corporate intranet, a Public Switched Telephone Network (PSTN), a metropolitan area network (MAN), a wide area network (WAN), a local area network (LAN), a mesh network, or another type of network.

MMS portal 150 may include one or more entities that gather, process, search, and/or provide information in a manner described herein. For example, in one implementation, MMS portal 150 may provide access to an MMS service provider that facilitates MMS services over a proprietary interface and/or protocol. In one implementation, sending device 110 and terminating device 120 may access the MMS services provided by MMS portal 150 via one or more of 3G network 130 and/or 2G network 140. MMS portal 150 may include a variety of infrastructure components to receive, store and/or transmit information regarding subscribers of the MMS service, including, for example, MMSC 152 and transcoder 154. MMS portal 150 may also include components necessary to facilitate MMS message traffic, including for example, one or more load balancers, gateways, and databases connected by a core infrastructure (not shown). In other implementations, features of certain components of portal 150 may be combined. For example, in one implementation, MMSC 152 and transcoder 154 may be combined. Conversely, a single component may be implemented as multiple, distributed components. Further, connections between the various components may be directly made or may be indirectly made via a node, a network, or a combination thereof.

MMSC 152 may include one or more server entities that manages the receipt and transmission of MMS services between user devices, such as sending device 110 and terminating device 120. Using applicable 2G, 3G, or 4G access technology, MMSC 152 may retrieve MMS messages sent by, for example, sending device 110 and may transmit MMS messages addressed to, for example, terminating device 120.

Transcoder 154 may include hardware- and/or software-based logic to transcode the MMS message according to the device type and network access of a terminating device, such as terminating device 120. For example, transcoder 154 may convert an MMS message with a high resolution image (e.g., a JPEG image having 640×480 resolution with 24 bits of color) to a lower resolution image with less color depth (e.g. 120×160 and 8 bits of color). In another example, transcoder may convert comparatively large audio file type to a smaller file format. Transcoder may perform similar conversions for video and other file types.

Still referring to FIG. 1, MMS message content sent by sending device 110 may not be entirely compatible with the network capabilities available to terminating device 120 at any particular point in time. For example, sending device 110 may provide an MMS message using 3G network 130. Terminating device 120 may be a 3G-enabled device capable of receiving large (e.g., 1 MB or more) files, but may be in a geographical location that is only supported by 2G network 120 at the time the MMS message is being forwarded by MMS portal 150. If basing the forwarding decision only on the type of terminating device, MMSC 152 would attempt to send the MMS message from sending device 110 to terminating device 120 at full size and resolution. This may result in message timeouts or extremely lengthy download times for terminating device 120. Thus, in one implementation, terminating device 120 may store separate UA profiles that can be used to indicate to MMSC 152 the currently available network environment (e.g., a 2G UA profile and 3G/4G UA profile). Before sending the MMS message to terminating device 120, MMSC 152 may identify the network environment for terminating device 120 based on the UA profile. If the UA profile from terminating device 120 indicates a 2G network, MMSC 152 may adapt the MMS message content (using e.g., transcoder 154 to resize images, perform audio codec transcoding, etc.) to accommodate the lower data rate of the 2G network.

One sending device, one terminating device, one MMS portal, one MMSC, one transcoder, one 2G network and one 3G network have been illustrated in FIG. 1 for simplicity. In practice, there may be more or fewer sending devices, terminating devices, MMS portals, MMSCs, transcoders and/or networks. Also, in some instances, one or more of sending device 110, terminating device 120, 3G network 130, 2G network 140, MMS portal 150, MMSC 152 and/or transcoder 154 may perform one or more functions described as being performed by another one or more of sending device 110, terminating device 120, 3G network 130, 2G network 140, MMS portal 150, MMSC 152 and/or transcoder 154.

Figure 2:
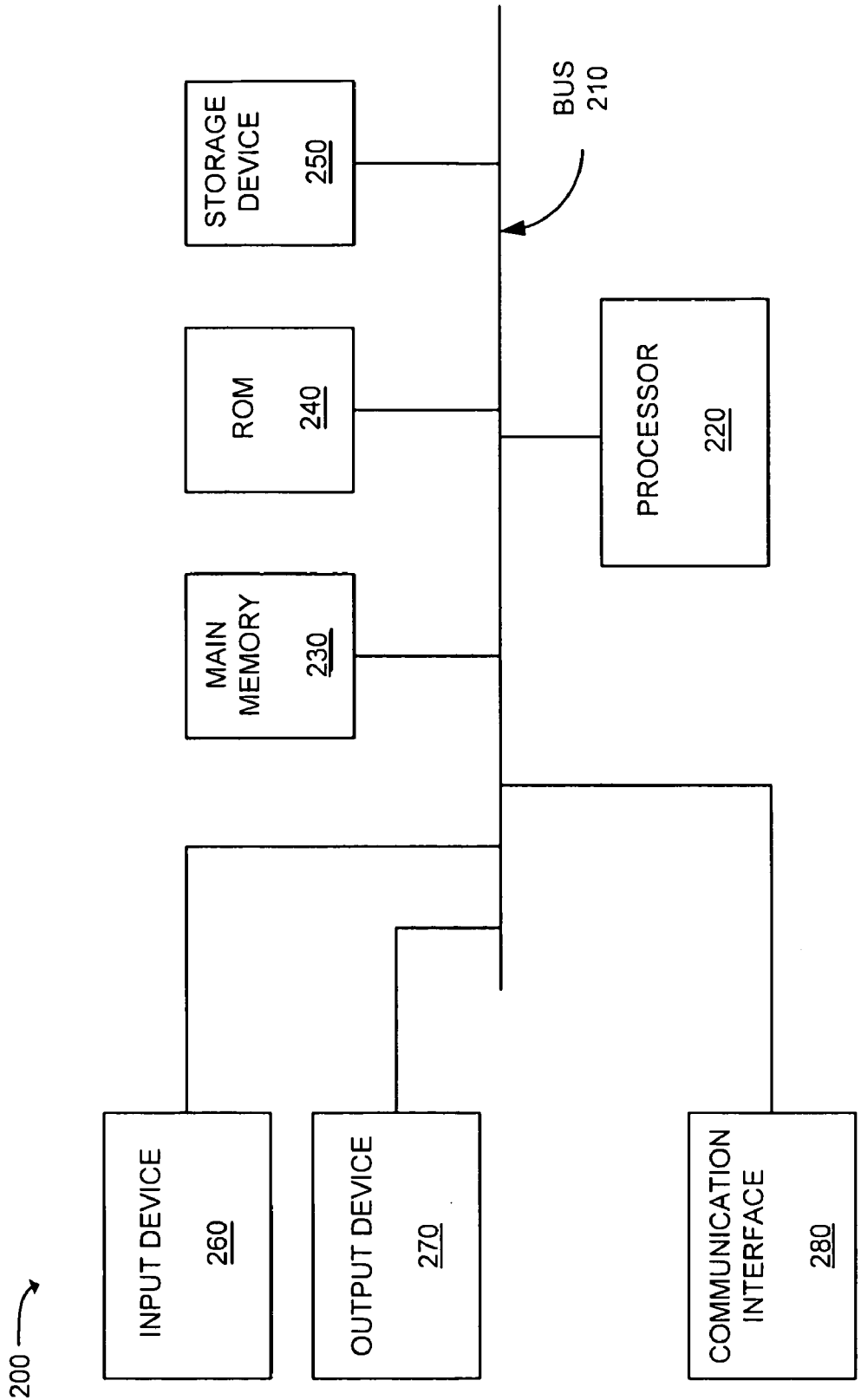
FIG. 2 is a diagram of an exemplary device that may be used in the system of FIG. 1.

FIG. 2 is an exemplary diagram of a device 200 that may correspond to any of sending device 110 and receiving device 120, MMSC 152, and/or transcoder 154. As illustrated, device 200 may include a bus 210, a processor 220, a main memory 230, a read only memory (ROM) 240, a storage device 250, an input device 260, an output device 270, and a communication interface 280. Bus 210 may include conductors or a pathway that permit communication among the components of device 200.

Processor 220 may include a processor(s), a microprocessor(s), or processing logic that interprets and executes instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Input device 260 may include one or more mechanisms that permit a user to input information to device 200, such as a keyboard, a touch screen, a touch pad, a mouse, a pen, voice recognition and/or biometric mechanisms, a camera, a video camera, an audio recorder, etc. Output device 270 may include one or more mechanisms that output information to the user, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 110.

As described herein, device 200 may perform certain operations in response to processor 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processor 220 to perform processes described herein.

Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may contain fewer or additional components that may compliment and enable an emergency forking/notification service. In still other implementations, one or more components of device 200 may perform the tasks performed by other components of device 200.

Figure 3:
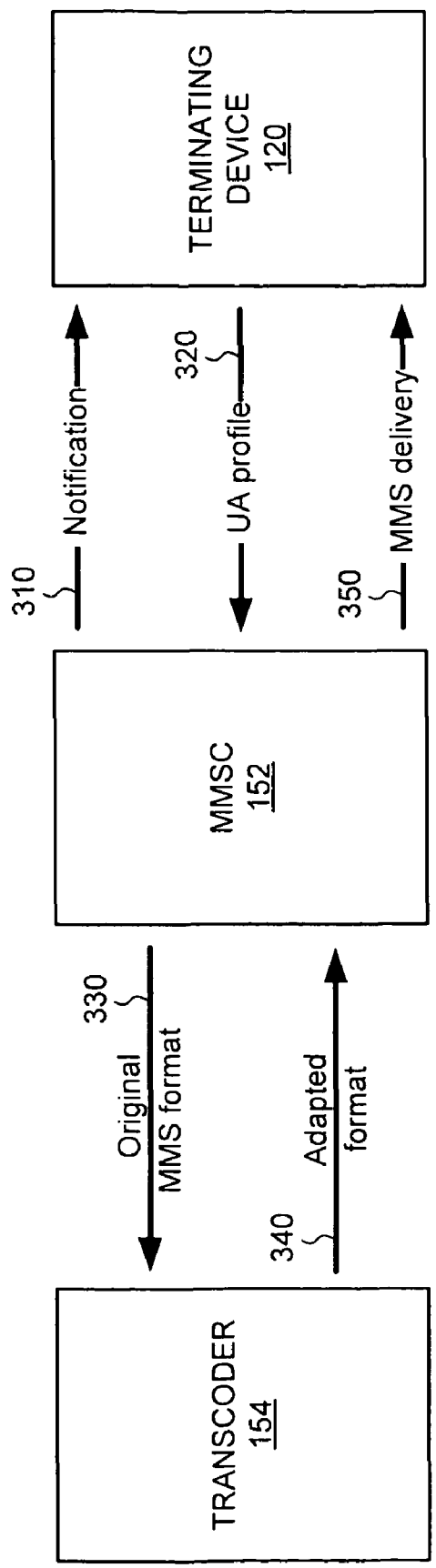
FIG. 3 is an exemplary functional diagram conceptually illustrating an implementation of network-specific transcoding for an MMS service.

FIG. 3 is an exemplary functional diagram conceptually illustrating an implementation of a network-specific transcoding for an MMS service. As shown in FIG. 3, MMSC 152 may provide a notification message (line 310) to terminating device 120 notifying terminating device 120 that an MMS message is available to send. The notification may be provided, for example, in the form of a wireless application protocol (WAP) push message.

Terminating device 120 may reply to the notification message with a message (line 320) indicating a UA profile. For example, terminating device may include one UA profile for a 2G network and one UA profile for a 3G/4G network. Terminating device 120 may determine the current carrier network status (e.g., 2G vs. 3G/4G) and send the corresponding UA profile indicating the network type. In one implementation, the UA profile string may be formatted as a network indicator appended to a device identifier, such as "DeviceID+ NetworkID." The device indicator may represent a particular phone model or range of models. The network indicator may represent a type of network, such as a 2G, a 3G or a 4G mobile network. For example, a device identifier of "LQ9700" may be appended with the network indicator "2G" to provide "LQ97002G" if terminating device 120 is a model LQ9700 phone currently being serviced by a 2G network. Similarly, a network indicator of "3G" may be used, if terminating device 120 determines the current carrier network is a 3G network. In another implementation, if no indicator is provided for a UA string, a 3G (or other high capacity network) may be presumed.

Based on the UA parameter provided by terminating device 120, MMSC 152 may forward the originally-formatted content from the MMS message to transcoder 154 (line 330). For example, in response to the UA string "LQ97002G" described above, MMSC 152 may forward the originally-formatted content from the MMS message to transcoder 154 to reduce the size of the MMS message content to a level appropriate for a 2G network. Transcoder 154 may also perform transcoding based on the device identifier provided in the UA string from terminating device 120. The adapted content from transcoder 154 may be provided back to MMSC 152 (line 340). MMSC 152 may then deliver the MMS to terminating device 120 in an optimal format for a 2G network.

Figure 4:
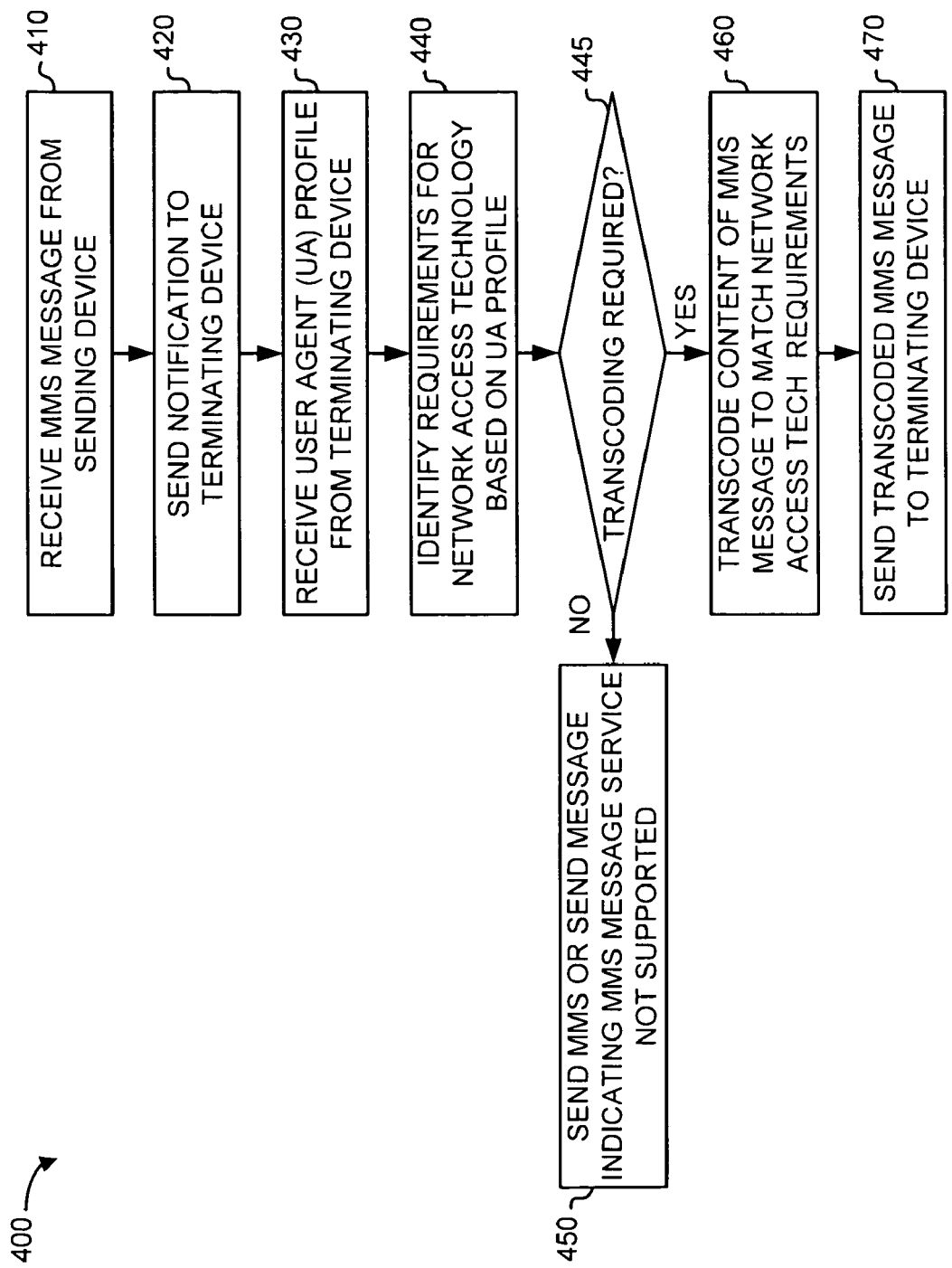
FIG. 4 is a flow chart illustrating exemplary operations that may be performed by an MMS portal in a system offering network-specific coding for MMS service.

FIG. 4 provides a flow chart 400 illustrating exemplary operations that may be performed by an MMS portal in a system offering network-specific coding for MMS service. The operations may be performed by an MMS portal (such as MMS portal 150) having an MMSC (such as MMSC 152) and a transcoder (such as transcoder 154) in response to a sending device (such as sending device 110) sending an MMS message to a terminating device (such as terminating device 120).

An MMS message may be received (block 410). For example, MMSC 152 may receive an MMS message from sending device 110. The MMS message may include, for example, content optimally transmitted over a 3G network.

A notification may be sent to a terminating device (block 420). For example, MMSC 152 may send a notification to terminating device 120 to indicate that a MMS message is available for the terminating device. In one implementation, the notification message may be provided as a WAP push message. In other implementations, the notification may take the form of a short message service (SMS) message or another message format that includes information, such as a uniform resource locator (URL), for MMSC 152.

A UA profile may be received from the terminating device (block 430). For example, MMSC 152 may receive a UA profile from terminating device 120. The UA profile may include a network indicator to indicate to the MMSC the type of network currently servicing terminating device 120. In one implementation, the UA profile may be provided via an internet protocol (IP) session, after an IP session has been established between MMSC 152 and terminating device 120.

The requirements for the network access technology identified in the UA profile may be identified (block 440). For example, MMSC 152 may optionally identify limits, such as file size limits or content format restrictions, associated with the type of network identified in the UA profile. The requirements for the network access technology may be stored in a memory (such as main memory 230 and/or storage device 250) within MMS portal 150 that can be later retrieved by, for example, MMSC 152. If a 2G network is identified in the UA profile, for example, MMSC 152 may perform a look-up of size restrictions and/or format types that may be supported by the 2G network for delivery of the particular content in the MMS message.

It may be determined if transcoding is required (block 445). For example, MMSC may review the attributes of the MMS message (e.g., file size, file type, quality of service (QoS) requirements, etc.) to determine if transcoding of the MMS content is necessary for optimal delivery to terminating device 120. Transcoding may not be required, for example, if terminating device 120 is currently being serviced by a 3G network. Also, transcoding may not be required if MMSC 152 determines that no transcoding options are available to conform the MMS message to meet size restriction and/or format types that can be supported by the current servicing network for terminating device 120.

If it is determined (in block 445) that transcoding is not required, the MMS may be sent in its originally-provided format or, alternatively, a message may be sent indicating MMS messaging service is not supported for the requested MMS message (block 450). For example, if MMSC 152 identifies from the UA profile that the current network servicing terminating device 120 fully supports the MMS message, the MMS message may be forwarded without transcoding. As another example, if MMSC 152 and/or transcoder 154 determines-based on, for example, the UA profile, the MMS message attributes, the network requirements of the servicing network, and the available transcoding algorithms—that the MMS message cannot be formatted to meet the requirements of the current service network, then MMSC 152 may send a message to terminating device 120 and/or sending device 110 to indicate that MMS messaging service is not supported for the requested MMS message. In another implementation, MMSC 152 may store the MMS message until terminating device 120 indicates (for example, in response to subsequent notification messages from MMSC 152) that a servicing network can support the MMS message. The MMS message may be stored, for example, in a memory, such as main memory 230 of FIG. 2.

If it is determined (in block 445) that transcoding is required, the content of the MMS message may be transcoded to match the requirements for the network access technology (block 460). For example, based on the limits identified by MMSC 152 in block 440, or based on a more general set of file size restrictions, transcoder 154 may transcode the content of the MMS message into an appropriate format for the type of network indicated in the UA profile.

The transcoded MMS message may be sent to the terminating device (block 470). For example, MMSC 152 may send the transcoded message to terminating device 120 via the network that is currently servicing terminating device 120, such as 2G network 140.

Figure 5:
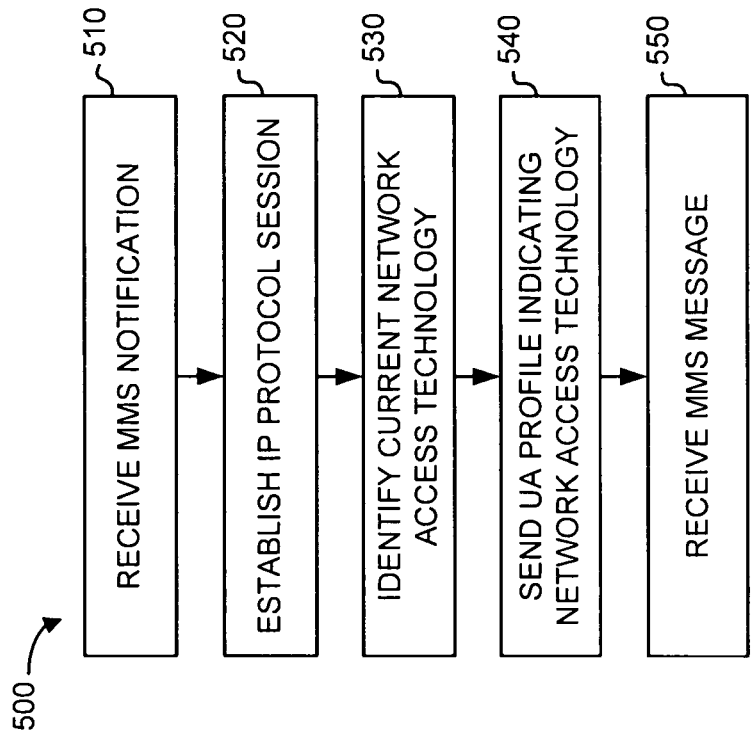
FIG. 5 is a flow chart illustrating exemplary operations that may be performed by a terminating device in a system offering network-specific coding for MMS service.

FIG. 5 provides a flow chart 500 illustrating exemplary operations that may be performed by a terminating device in a system offering network-specific coding for MMS service. The operations may be performed by a terminating device (such as terminating device 120) that is an intended recipient of an MMS message being sent from a sending device (such as sending device 110) via an MMS portal (such as MMS portal 150).

An MMS notification may be received (block 510). For example, terminating device 120 may receive a notification from MMS portal 150 that an MMS message is available to be delivered. The notification message may be provided as a WAP push message, an SMS message or another message format that includes information for communicating with MMS portal 150, such as a uniform resource locator (URL) for MMS portal 150.

An internet protocol (IP) session may be established (block 520). For example, terminating device 120 may establish an IP session with MMS portal 150. The IP protocol session may allow terminating device 120 to communicate with MMS portal 150 and to retrieve the available MMS message from MMS portal 150 using the network access technology currently available to terminating device 120 (e.g., 2G, 3G, or 4G access technology).

The current network technology may be identified (block 530). For example, terminating device 120 may determine the type of network coverage (e.g., 2G, 3G, or 4G) currently servicing terminating device 120. In one implementation, the type of network coverage may be able to be identified by terminating device 120 directly. In another implementation, terminating device 120 may request network information from, for example, a device management entity of the network service provider associated with terminating device 120.

A UA profile indicating the current network technology may be sent (block 540). For example, based on the current network technology identified in block 530, terminating device 120 may send to MMS portal 150 the UA profile for terminating device 120 that corresponds to the type of available network coverage (e.g., a 2G UA profile or a 3G/4G UA profile). The UA profile may include a network identifier to indicate the type of coverage currently available to terminating device 120.

The MMS message may be received (block 550). For example, terminating device 120 may receive from MMS portal 150 the MMS message in a format best suited for the type of network coverage indicated in the UA profile. If terminating device 120 is a currently being serviced by a network with comparatively lower downlink data rates (e.g., a 2G network), terminating device 120 may receive the MMS message with an adapted content format to accommodate limitations of the network. If terminating device 120 is a currently being serviced by a network with comparatively higher downlink data rates (e.g., a 3G or 4G network), terminating device 120 may receive the MMS message in its original format from the sender.

FIG. 6 provides an example of a user using a mobile device in accordance with an exemplary implementation. Assume two users, person 610 and person 620, are both subscribers of an MMS messaging service using identical types of mobile devices. Person 610 may be camping, for example, in a forest where only a 2G network service is available. Person 620 may send an MMS message from their home location (which has 3G network service). The MMS message may include a small audio clip about impending inclement weather in the forest. The audio clip may be sent from the mobile device of person 620 (e.g., a sending device) in waveform audio format (a ".wav" extension file) that is 1.5 MB in size.

The MMSC for the MMS messaging service may retrieve the MMS message from person 620 and send a WAP push message to the mobile device of person 610 to indicate that an MMS message is available. Upon receiving the WAP push message, the mobile device of person 610 confirms that only a 2G network is currently available. The mobile device of person 610 initiates an IP protocol session with the MMSC and provides to the MMSC a UA profile including the device type and network indicator. The MMSC determines that the 2G network currently servicing the mobile device of person 610 cannot effectively support transmission of the 1.5 MB audio clip. Thus, a transcoder associated with the MMSC may convert the audio clip from waveform audio format to MPEG-1 audio layer 3 (MP3) format, reducing the file size from 1.5 MB to about 250 kB. The modified MMS message is then sent to the mobile device of person 610.

Systems and methods described herein may provide a way to determine if transcoding of an MMS message is required based on the type of network indicated in a user agent profile send from the terminating device. When an MMS message is received at a MMS portal from a sending device, a notification may be sent to the terminating device that the MMS message is available. The terminating device may provide to the MMS portal a user agent profile that includes a network indicator to indicate the type of network that is currently servicing the terminating device. It may then be determined if transcoding of the MMS message is required based on the type of network indicated in the user agent profile and attributes of the MMS message. If necessary, a transcoder may transcode the MMS message into an appropriate format for delivery over the type of network indicated in the user agent profile.

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, while network identification has been described herein primarily in the context of 2G vs. 3G networks, network-specific transcoding of MMS content may be implemented in any instance that a terminating device indicates that the network servicing the terminating device does not have adequate capability to deliver MMS content in the format originally-transmitted by the sending device. Thus, in one implementation, the network servicing the terminating device may be a 3G network, while the network servicing a sending device may be a 4G network or the Internet. In other implementations, other variations of network services, such as 2.5G or 2.75G, may be identified by a UA profile and the MMS content optimized accordingly. In still other implementations, other types of network descriptors (such as code division multiple access (CDMA)—or time division multiple access (TDMA)-based descriptors) may be provided in a UA profile to identify more specific network capacities for delivering MMS messages.

Also, while series of blocks have been described with regard to the flowcharts of FIGS. 4 and 5, the order of the blocks may differ in other implementations. Further, non-dependent acts may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware, such as a processor, microprocessor, an application specific integrated circuit or a field programmable gate array; or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method, comprising:
   receiving, by a device, a multimedia messaging service (MMS) message from a sending device, the MMS message being addressed to a terminating device;
   sending, by the device, a notification to the terminating device that the MMS message is available;
   receiving, by the device and in response to the notification, a user agent profile string from the terminating device, the user agent profile string including a model identifier of the terminating device and a network indicator that indicates a type of network currently servicing the terminating device;
   retrieving, by the device, stored information associated with the type of network indicated by the user agent profile string, the information including at least one of a message size limit or a message format restriction;
   determining, by the device, if transcoding of the MMS message is required based on at least one of the model identifier or the type of network indicated in the user agent profile string and attributes of the MMS message;
   transcoding, by the device and in response to determining that transcoding is required, the MMS message into an appropriate format for delivery by accessing the retrieved information;
   sending the transcoded MMS message to the terminating device;
   receiving another MMS message addressed to the terminating device;
   storing, in response to determining that transcoding is required, the other MMS message;
   receiving, from the terminating device, information indicating that the type of network, currently servicing the terminating device, can support the other MMS message; and
   sending, in response to receiving the information, the other MMS message to the terminating device.

2. The method of claim 1, where the MMS message includes an image file and where transcoding the MMS message comprises:
   transcoding the image file from a higher resolution image to a lower resolution image.

3. The method of claim 1, further comprising:
   identifying requirements associated with delivering MMS messages over the type of network indicated in the user agent profile string.

4. The method of claim 1, where determining if transcoding of the MMS message is required is further based on requirements of the network indicated in the user agent profile string.

5. The method of claim 1, further comprising:
   sending a message to at least one of the terminating device or the sending device to indicate that MMS messaging service is not supported for the MMS message on the type of network indicated in the user agent profile string.

6. The method of claim 1, where the model identifier further includes identifiers for a range of device models.

7. The method of claim 1, further comprising:
   establishing an IP protocol session between the terminating device and a multimedia messaging service center (MMSC).

8. The method of claim 1, where the type of network indicated by the network indicator is one of a 2G mobile network or a 3G mobile network.

9. A method performed by a mobile device, comprising:
   receiving, by the mobile device, a notification from a multimedia messaging service (MMS) portal that a first MMS message is available to be delivered;
   establishing, by the mobile device, an internet protocol (IP) session with the MMS portal;
   determining, by the mobile device and in response to the notification, a first type of network coverage currently servicing the mobile device;
   sending, by the mobile device and to the MMS portal, a first response that includes a user agent profile string for the mobile device, the user agent profile string including a model identifier of the mobile device and a first network indicator that indicates the first type of network coverage currently servicing the mobile device;
   receiving, by the mobile device and from the MMS portal, the first MMS message in a transcoded format adapted for at least one of the model identifier or the type of network coverage included in the user agent profile string;
   receiving, by the mobile device, a second notification from the MMS portal that a second MMS message is available to be delivered;
   sending, by the mobile device, a second response that includes an updated user agent profile string, the updated user agent profile string including a second network indicator that is different than the first network identifier, the second network indicator indicating a second type of network coverage servicing the mobile device, the second type of network being different than the first type of network; and receiving, by the mobile device and from the MMS portal, the second MMS message in a format adapted for the network coverage included in the updated user agent profile string.

10. The method of claim 9, where the first network indicator indicates a 2G mobile network or a 3G mobile network.

11. The method of claim 9, where the first network indicator indicates a particular type of code division multiple access (CDMA) network.

12. The method of claim 9, where the model identifier further includes identifiers for a range of device models.

13. The method of claim 9, where determining the first type of network coverage currently servicing the mobile device comprises:

requesting network coverage information from a device management entity of a network service provider associated with mobile device.

14. A system, comprising:
a multimedia messaging service center (MMSC) to:
receive a MMS message addressed to a terminating device,
send a notification to the terminating device that an MMS message is available,
receive, in response to the notification, a user agent profile string from the terminating device, the user agent profile string including a model identifier of the terminating device and a network identifier indicating a type of network coverage currently servicing the terminating device, retrieve stored information associated with the type of network indicated by the user agent profile string, the information including at least one of a message size limit or a message format restriction, and
determine if transcoding of the MMS message is required based on at least one of the model identifier or the type of network indicated in the user agent profile string and attributes of the MMS message; and
a transcoder to:
transcode, in response to the MMSC determining that transcoding is required, the content of the MMS message into an appropriate format by accessing the retrieved information,
the MMSC being further to:
receive another MMS message addressed to the terminating device;
store, in response to determining that transcoding is required, the other MMS message;
receive, from the terminating device, information indicating that the type of network, currently servicing the terminating device, can support the other MMS message; and
send, in response to receiving the information, the other MMS message to the terminating device.

15. The system of claim 14, where the MMSC is further to send the transcoded MMS message to the terminating device.

16. The system of claim 14, where the model identifier further includes identifiers for a range of device models.

17. A system, comprising:
means for receiving a multimedia messaging service (MMS) message from a sending device, the MMS message being addressed to a terminating device;
means for sending a notification to the terminating device that an MMS message is available;
means for receiving, in response to the notification, a profile string of the terminating device, the profile string including a model identifier of the terminating device and a network indicator that indicates the type of network currently servicing the terminating device;
means for retrieving stored information associated with the type of network indicated by the profile string, the information including at least one of a message size limit or a message format restriction;
means for determining if transcoding of the MMS message is required based on at least one of the model identifier or the type of network indicated in the profile string and attributes of the MMS message;
means for transcoding, in response to determining that transcoding is required, the MMS message into an appropriate format for delivery by accessing the retrieved information;
means for receiving another MMS message addressed to the terminating device;
means for storing, in response to determining that transcoding is required, the other MMS message;
means for receiving, from the terminating device, information indicating that the type of network, currently servicing the terminating device, can support the other MMS message; and
means for sending, in response to receiving the information, the other MMS message to the terminating device.

18. The system of claim 17, where the model indicator further includes identifiers for a range of device models.

* * * * *